(12) United States Patent
Ferron et al.

(10) Patent No.: US 10,605,465 B2
(45) Date of Patent: Mar. 31, 2020

(54) SYSTEM AND METHOD FOR USING ALTERNATIVE ENERGY SOURCE FOR HOT WATER HEATER STORAGE TANK

(71) Applicants: Joseph Ferron, Wheaton, IL (US); Wayne Robert Schindler, Lisle, IL (US)

(72) Inventors: Joseph Ferron, Wheaton, IL (US); Wayne Robert Schindler, Lisle, IL (US)

(73) Assignee: Robertshaw Controls Company, Itasca, IL (US)

( * ) Notice: Subject to any disclaimer, the term of this patent is extended or adjusted under 35 U.S.C. 154(b) by 327 days.

(21) Appl. No.: 15/331,503

(22) Filed: Oct. 21, 2016

(65) Prior Publication Data

US 2017/0122574 A1 May 4, 2017

Related U.S. Application Data

(60) Provisional application No. 62/247,635, filed on Oct. 28, 2015.

(51) Int. Cl.
| | | |
|---|---|---|
| *F24D 17/00* | (2006.01) | |
| *F24D 19/10* | (2006.01) | |
| *H05B 1/02* | (2006.01) | |
| *H05B 1/00* | (2006.01) | |

(52) U.S. Cl.
CPC ..... *F24D 17/0068* (2013.01); *F24D 19/1057* (2013.01); *F24D 19/1063* (2013.01); *H05B 1/00* (2013.01); *H05B 1/0269* (2013.01); *F24D 2200/08* (2013.01); *F24D 2200/14* (2013.01); *F24D 2200/32* (2013.01); *Y02B 10/20* (2013.01); *Y02B 10/70* (2013.01)

(58) Field of Classification Search
CPC ............ F24D 17/0068; F24D 19/1057; F24D 19/1063
USPC ...................................................... 236/20 R
See application file for complete search history.

(56) References Cited

U.S. PATENT DOCUMENTS

| | | | | |
|---|---|---|---|---|
| 3,890,936 | A * | 6/1975 | McInerney | F24H 1/165 122/14.2 |
| 4,126,122 | A * | 11/1978 | Bross | F24D 17/0068 126/400 |
| 4,370,764 | A * | 2/1983 | Ando | E03D 9/08 4/420.2 |
| 4,436,506 | A * | 3/1984 | Berkhof | F23N 5/006 236/15 E |
| 4,924,112 | A * | 5/1990 | Anderson | H03K 17/0822 326/32 |
| 5,293,447 | A * | 3/1994 | Fanney | F24D 19/1057 136/248 |
| 5,347,985 | A * | 9/1994 | Bucciarelli | F24D 19/1057 126/572 |

(Continued)

*Primary Examiner* — Henry T Crenshaw
(74) *Attorney, Agent, or Firm* — Reinhart Boerner Van Deuren P.C.

(57) ABSTRACT

Appliances, such as hot water heaters, hot water heater controllers, and methods of operating such hot water heaters, that take into consideration the availability and capacity of alternative energy sources so that additional efficiencies can be realized by sensing the availability of an alternative energy source and adjusting the control algorithms used to control the use of the available electric power is provided.

18 Claims, 7 Drawing Sheets

(56) References Cited

U.S. PATENT DOCUMENTS

| | | | | |
|---|---|---|---|---|
| 5,927,599 | A * | 7/1999 | Kath | G05D 23/1905 236/47 |
| 5,968,393 | A * | 10/1999 | Demaline | G05D 23/1904 219/485 |
| 6,286,109 | B1 * | 9/2001 | Pirdy | G06F 1/203 320/106 |
| 2003/0037267 | A1 * | 2/2003 | Gauthier | H03K 17/164 713/300 |
| 2007/0012678 | A1 * | 1/2007 | Authier | F24D 19/1057 219/219 |
| 2007/0235440 | A1 * | 10/2007 | Gu | H05B 1/0244 219/482 |
| 2010/0212752 | A1 * | 8/2010 | Fima | F24H 9/2007 137/87.03 |
| 2011/0067851 | A1 * | 3/2011 | Terlson | F24F 6/043 165/227 |
| 2012/0010845 | A1 * | 1/2012 | Bohan | G01K 15/007 702/130 |
| 2013/0091883 | A1 * | 4/2013 | Perez | F25B 30/02 62/203 |

* cited by examiner

SYSTEM AND METHOD FOR USING ALTERNATIVE ENERGY SOURCE FOR HOT WATER HEATER STORAGE TANK

CROSS-REFERENCE TO RELATED PATENT APPLICATION

This patent application claims the benefit of U.S. Provisional Patent Application No. 62/247,635, filed Oct. 28, 2015, the entire teachings and disclosure of which are incorporated herein by reference thereto.

FIELD OF THE INVENTION

This invention generally relates to heating controls for consumer and commercial appliances, and more particularly to heating controls for hot water heaters.

BACKGROUND OF THE INVENTION

It has now been recognized that the world's environment is suffering too much from global warming caused by greenhouse gas exposure in the atmosphere. To address this problem governments are now starting to adopt targets for reducing the emission of greenhouse gases to the environment and play their part to address this problem for future generations. While some countries have not adopted a firm goal, other countries, for example Australia, have adopted a policy for the reducing greenhouse gases by 20% by the year 2020.

Greenhouse gases can be emitted from cars, industry, farming, and households to name a few. While certainly not as apparent as a large factory with tall smokestacks, within a normal household the gas burning appliances, such as furnaces, water heaters, etc., all release such greenhouse gases as a by-product of the combustion process itself. While the appliance industry has taken a leading role in energy efficiency and environmental concern, further improvement is always foremost in mind of the appliance design engineer.

With such further improvement in mind, especially with the increased awareness of global climate change and changing governmental regulations, it is noted that hot water heaters can be one of the more fairly inefficient appliances in energy conservation, and therefore require the burning of additional fuel or the converting of more electricity to heat to maintain the set point temperature. This, of course, results in the additional production of greenhouse gas directly from the appliance beyond that which a more efficient appliance would produce.

Recognizing the issue of greenhouse gas, many consumers have moved from gas burning appliances to electric appliances. A typical electric water heater includes one or two electric heating elements to heat water within a water holding tank. Particularly, when the water within the holding tank drops below a predetermined temperature, there is a call for heat and the heating elements are energized to raise the temperature of the water. Once the temperature of the water is raised to a predetermined or user determined set temperature the heating elements are deactivated.

Typically, in water heaters having two heating elements, the heating elements are spaced vertically apart from one another. Further, when there is a call for heat, the heating elements can be controlled by a controller such that they can be energized simultaneously, or independent of one another to provide the most efficient heating of the water, depending on operating conditions and inputs by the operator.

To determine the temperature of the water within the holding tank, the water heaters include temperature sensors. Typically, a temperature sensor is placed above and proximate to each heating element. Thus, the individual temperature sensors can determine the localized temperature of the water proximate the individual heating elements. This allows for localized heating of the water in the water heater to, again, improve efficiency.

In addition to the movement from gas burning to electric appliances, many consumers have installed alternative energy sources of electricity, such as wind turbines, solar panels, etc. to further reduce the production of greenhouse gases. While such alternative energy sources can have a great impact in this regard, their availability and capacity can be limited compared to electric power from the grid. Unfortunately, current appliances are not designed in any way to recognize this limitation, and instead continue to operate as if the availability of electric power is limitless.

What is needed are appliances, appliance controllers, and methods of operating such appliances to take into consideration the availability and capacity of alternative energy sources so that additional efficiencies can be had. The invention provides such appliances, appliance controllers, and methods of operating such appliances. These and other advantages of the invention, as well as additional inventive features, will be apparent from the description of the embodiments of the present invention provided herein.

BRIEF SUMMARY OF THE INVENTION

In one aspect, embodiments of the present invention provide appliances, appliance controllers, and methods of operating such appliances that take into consideration the availability and capacity of alternative energy sources so that additional efficiencies can be realized.

In another aspect, embodiments of the present invention provide appliances, appliance controllers, and methods of operating such appliances that take into consideration the availability and capacity of alternative energy sources so that additional efficiencies can be realized by sensing the availability of an alternative energy source and adjusting the control algorithms used to control the use of the available electric power.

In yet another aspect, embodiments of the present invention provide hot water heaters, hot water heater controllers, and methods of operating such hot water heater that take into consideration the availability and capacity of alternative energy sources so that additional efficiencies can be realized by sensing the availability of an alternative energy source and adjusting the control algorithms used to control the use of the available electric power.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Turning now to the Drawings, there are illustrated various embodiments of electronic controllers, exemplary appliances, and control methods in accordance with the teachings of the present invention. While such embodiments will be described herein, those skilled in the art will recognize that such embodiments are provided by way of example and not by way of limitation. Indeed, other embodiments of the present invention will become apparent to those skilled in the art from the following description and attached figures, and all rights are reserved therein.

Figure 1:
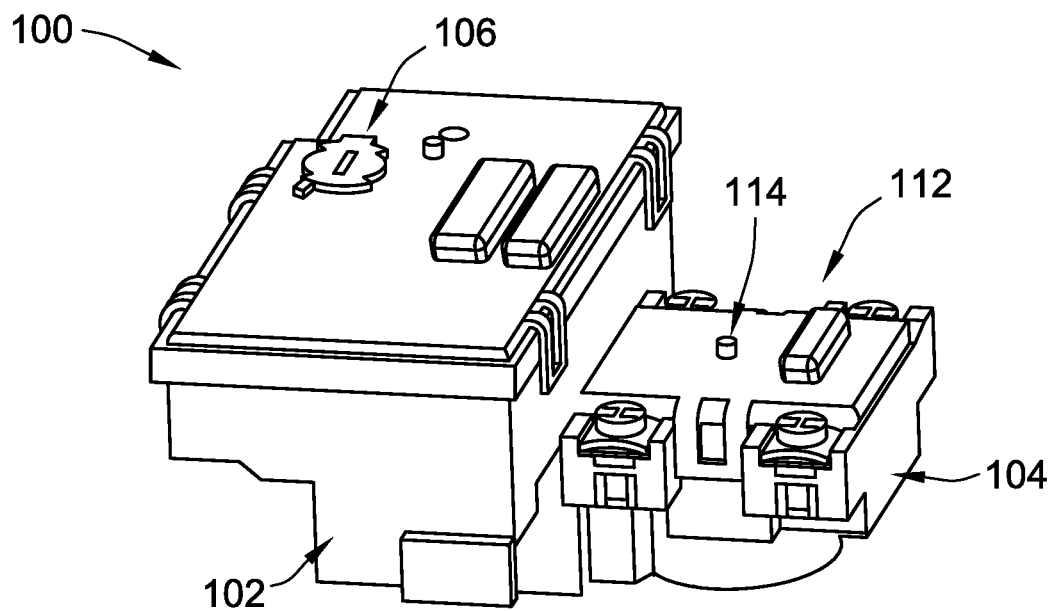
FIG. 1 is an isometric view of an embodiment of a single element hot water electronic controller constructed in accordance with the teachings of the present invention.

FIG. 1 illustrates one embodiment of an electronic controller 100 that is particularly well adapted for use with a single element hot water heater (not shown). This controller 100 has a modular design that locates the control and power switching elements in different portions of the housing. In the control section 102 the controller electronics are housed and insulated from the relays and power switching elements contained in the power section 104 of controller 100.

Figure 2:
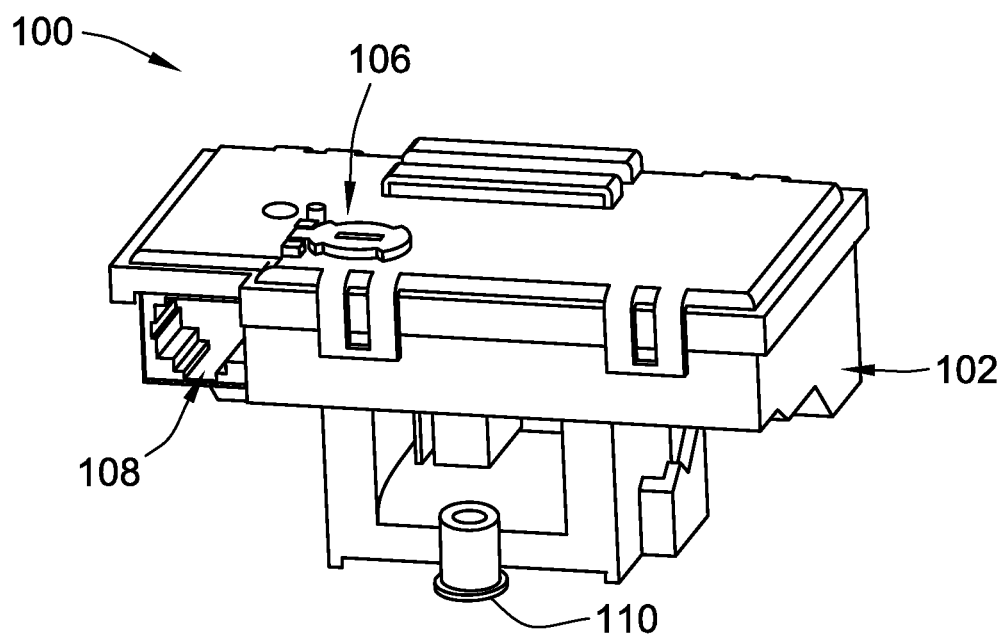
FIG. 2 is an isometric view of the embodiment of the single element hot water electronic controller of FIG. 1 rotated 90°.

In the embodiment illustrated in FIG. 1, a user temperature adjustment interface 106 is provided to allow the user to adjust the temperature set point for the hot water heater. This control section 102 also includes an interface for external communication via, e.g., an RS485 port 108 as may best be seen in FIG. 2. Also visible in this FIG. 2 is the integrated temperature probe 110 that provides temperature sensing, in some embodiments, of the water storage tank on which it is mounted.

Returning again to FIG. 1, the power switching section 104 of controller 100 includes a bi-metal high temperature limit device 112 that ensures that power is cut off to the heating element in the event of a system failure that could cause excessive heating of the water in the storage tank. Once activated, the user would need to push the high limit reset button 114 in order to reset the bi-metal high limit device 112 to allow for continued operation.

Figure 3:
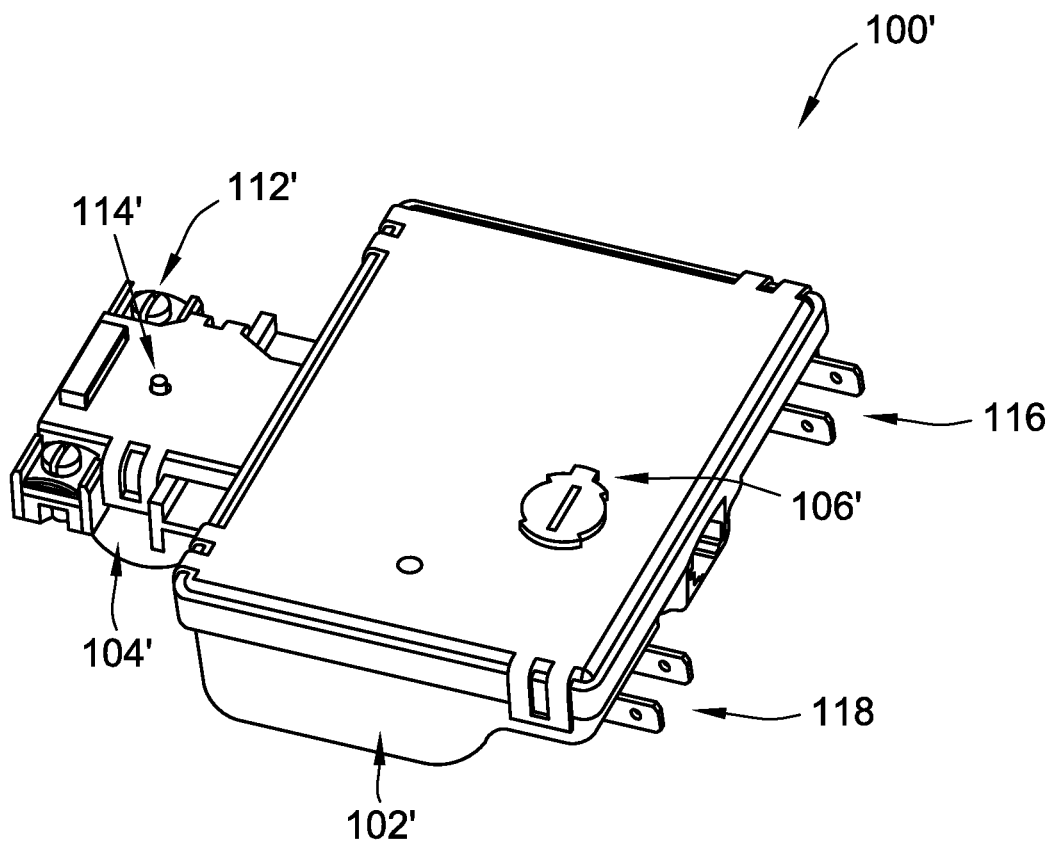
FIG. 3 is an isometric view of an embodiment of a dual element hot water electronic controller constructed in accordance with the teachings of the present invention.
Figure 4:
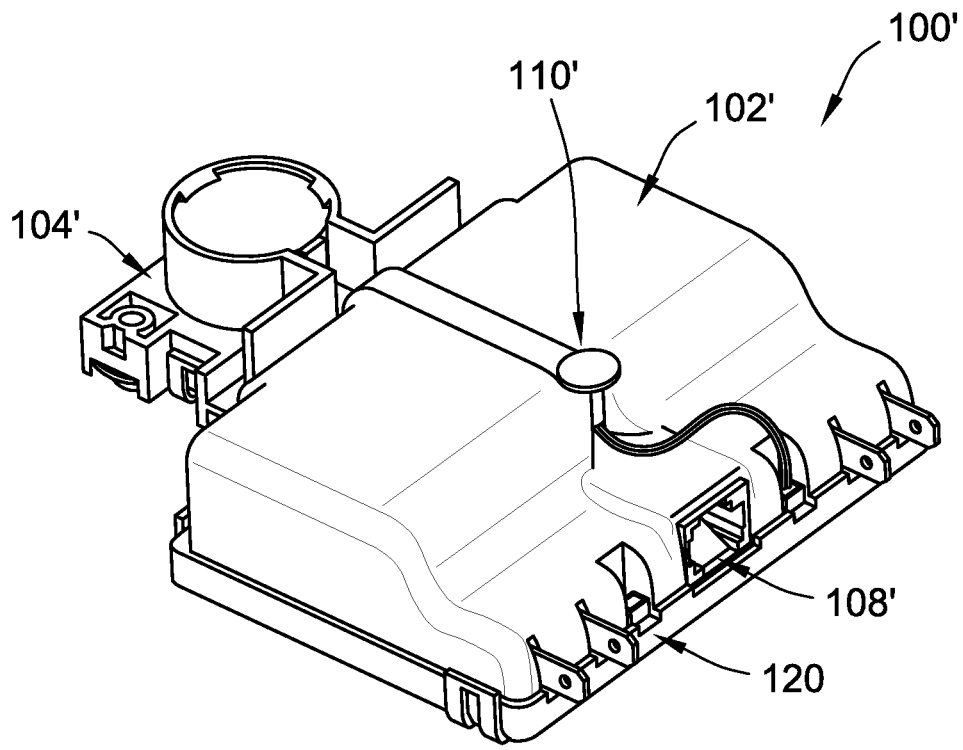
FIG. 4 is an isometric view of the embodiment of a dual element hot water electronic controller of FIG. 3 showing the opposite side thereof.

FIG. 3 and FIG. 4 illustrate an embodiment of the electronic controller of the present invention particularly adapted to a dual element hot water heater having an upper heating element and a lower heating element (not shown). It is noted that similar components in this embodiment utilize the same numerical designation with an appended apostrophe in this embodiment. For example, the controller is now designated in this embodiment as 100'.

While the function of these similar components is the same, and therefore a discussion thereof will be avoided in the interest of brevity, there are additional components and features provided in this embodiment to accommodate the dual heating elements and dual temperature sensing accommodated thereby. For example, FIG. 3 illustrates the power connections 116, 118 that are connected to the top and bottom heating elements of the hot water heater. FIG. 4 also illustrates the connector 120 for the top temperature sensor of the hot water tank in addition to the integrated temperature probe 110' that serves as the temperature sensor for the bottom of the hot water tank based upon the typical installation location of the electronic controller on such an appliance.

Figure 5:
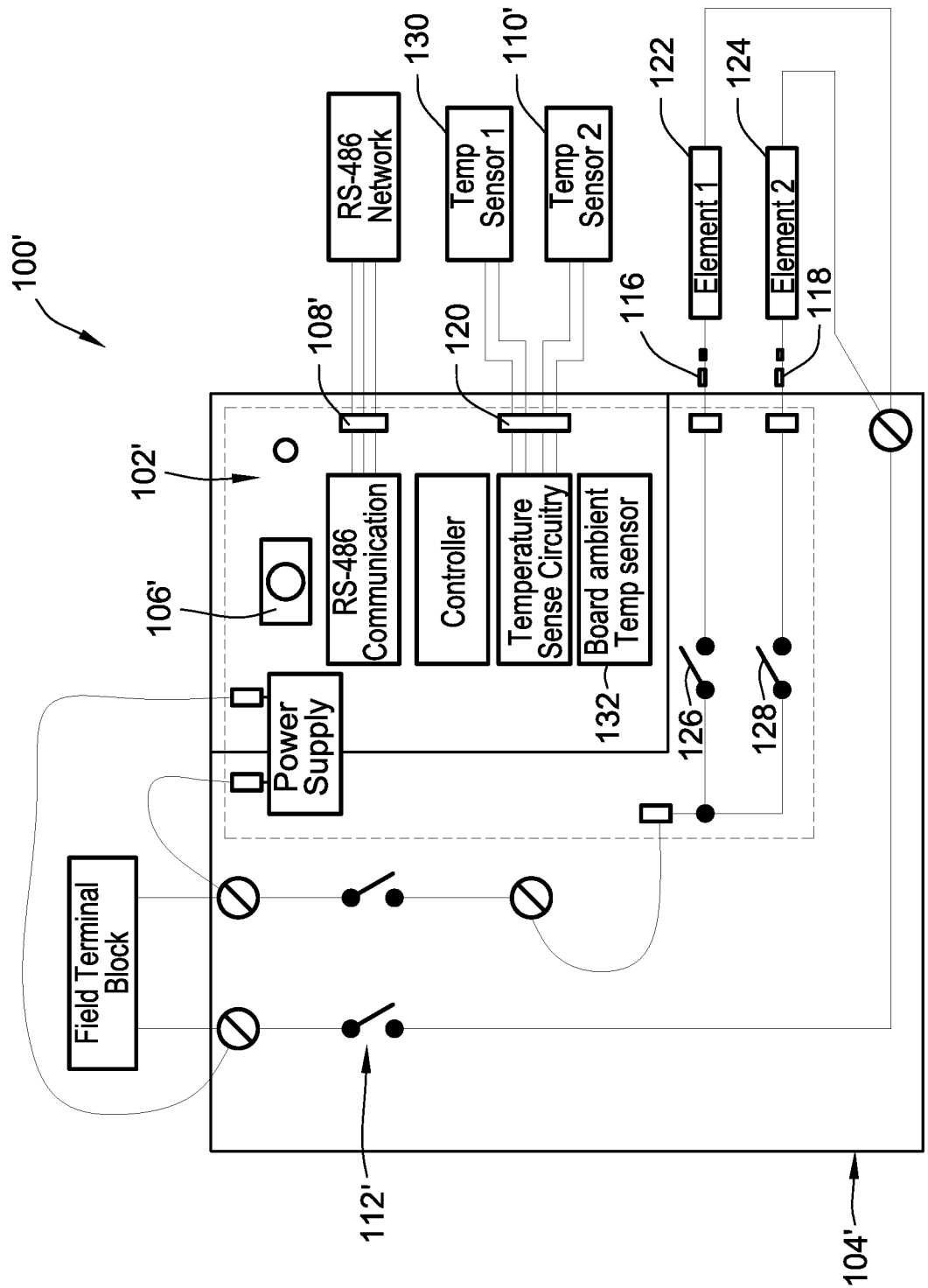
FIG. 5 is a simplified block diagram of the embodiment of a dual element hot water electronic controller of FIG. 3.

FIG. 5 illustrates a simplified block diagram of the dual element electronic controller 100' in order to provide additional information on the internal components and partitions between the control section 102' and the power switching section 104', and the external connections to other system elements. As may be seen from this block diagram, the power switching section 104' includes the high temp limit switch, e.g. the bi-metal high limit 112' that serves to break both the power lines L1, L2 so as to disconnect power from the heating elements 122, 124. In the control section 102', the low voltage isolated control circuitry is segregated from the switching relays 126, 128 that provide the controlled power to the heating elements 122, 124. As may be seen from this FIG. 5, in addition to the upper temperature sensor 130 and the lower temperature sensor 110', in one embodiment an additional board ambient temperature sensor 132 is provided in order to sense PCB temperature, correct for thermal drift of the temperature sensing circuitry, for diagnostics, etc. as is known in the art.

Figure 6:
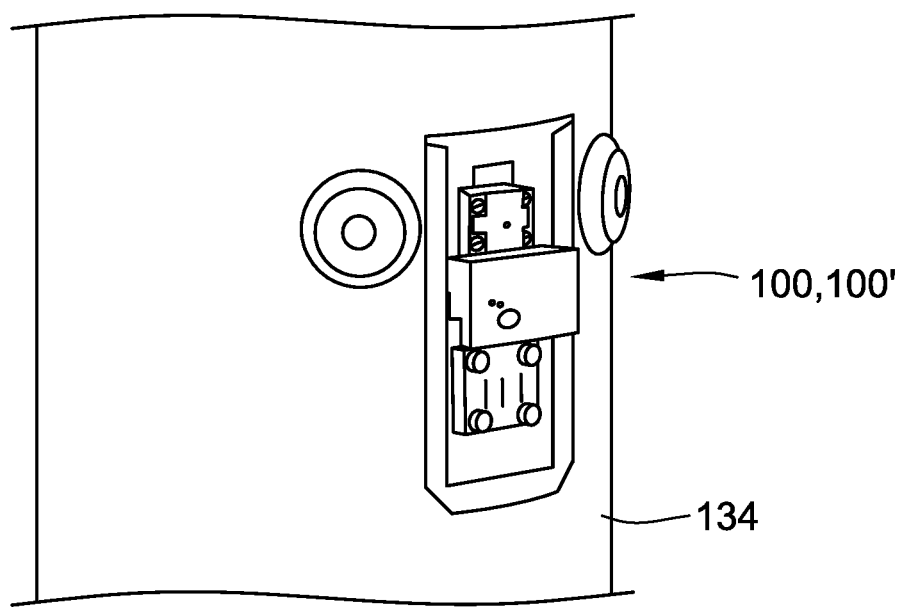
FIG. 6 is a partial isometric illustration of an embodiment of the hot water controller of the present invention installed on a hot water heater appliance within the same footprint as prior electromechanical controls.

In preferred embodiments, the physical layout and configuration of the controller 100, 100' are such that they are line replaceable for conventional electronic or electromechanical controllers in field installed appliances in order to allow them to take advantage of the control algorithms of the present invention to accommodate the use of alternative energy sources. Such an exemplary installation is illustrated in FIG. 6 wherein the controller 100, 100' has been installed in a hot water heater 134.

Figure 7:
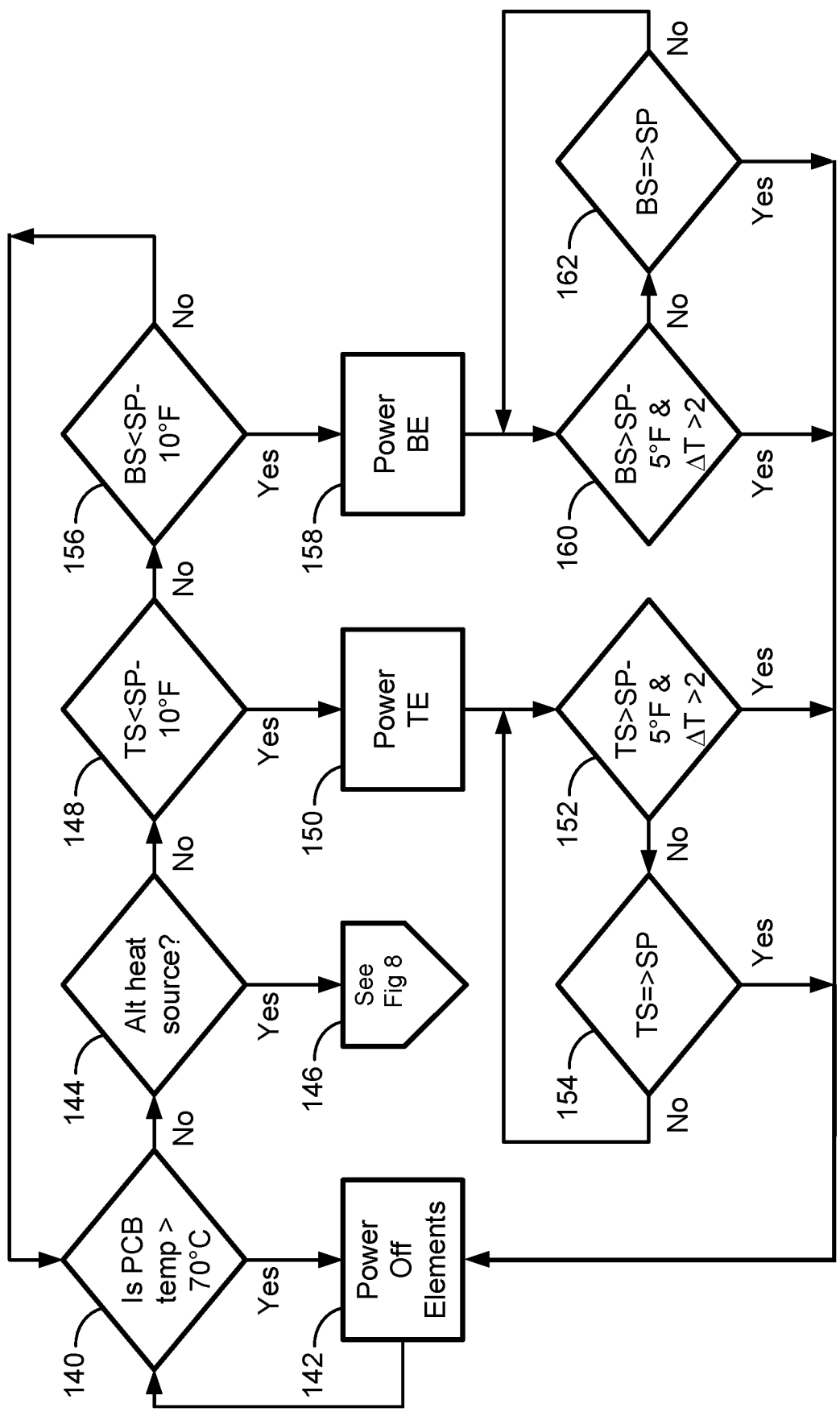
FIG. 7 is a simplified process control flow diagram for an embodiment of the present invention illustrating control of a two element hot water heater utilizing grid power.
Figure 8:
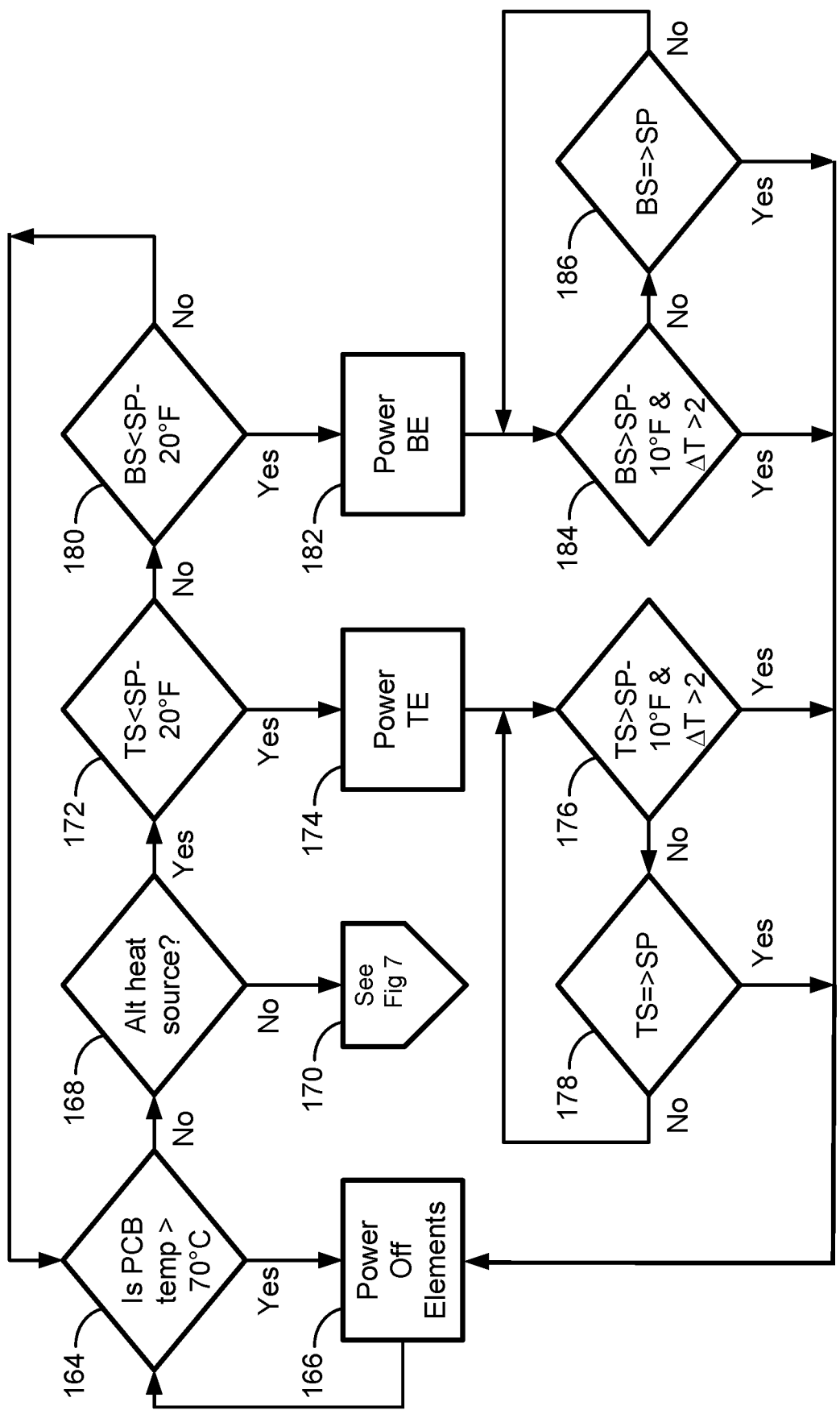
FIG. 8 is a simplified process control flow diagram for an embodiment of the present invention illustrating control of a two element hot water heater utilizing an alternative energy source.

With an understanding of the physical configuration of the embodiments discussed above, attention is now directed to the control flow diagrams of FIG. 7 and FIG. 8 so that operation of the controller that enables the environmental utilization of the alternative power source may be understood. Such operation prioritizes the use of the alternative energy source and provides it with additional time to accomplish the heating of the water so as to not tax the capacity of the source. Within the control flow diagrams of FIG. 7 and FIG. 8, the abbreviations of "TS" refer to the top temperature sensor; "BS" refers to the bottom, also known as, the lower temperature sensor; "SP" refers to set point; "TE" refers to a top element; and "BE" refers to a bottom element.

Beginning with FIG. 7, the system first checks the PCB ambient temperature to ensure that it is within operating temperature parameters at decision block 140. Specifically, this step 140 determines whether the ambient temperature is greater than 70° C. If the PCB temperature is greater than 70° C., step 142 powers off the elements and returns to decision block 140. If, however, the PCB temp is less than 70° C., the system next checks to see whether an alternative heat source is available at decision block 144. If an alternative energy source is available, then it is prioritized and the control of the system is transitioned to the flow diagram of FIG. 8, which will be discussed more fully below, at step 146.

However, if no alternative source of energy is available, i.e. the system will operate off of grid power, the system next checks to determine whether the top temperature sensor is less than the set point by 10° F. or more at step 148. If step 148 is affirmative, then the system powers the top heating element at step 150. Thereafter, the system will check to determine whether the temperature as read by the top temperature sensor is within 5° F. of the set point temperature with a rise of greater than a predetermined ramp rate of, e.g. 2° F. per second at step 152. If this condition is true, then the controller may remove power from the top heating element at step 142 because with such a rate of rise within range of the set point, the thermal inertia of the system will likely result in the temperature reaching the set point. However, if step 152 is negative, then the system will check to see if the temperature sensed by the top temperature sensor is greater than or equal to the set point at step 154. If this condition is true the system may then de-energize the heating element at step 142 as the desired condition is then met. However, if this decision at step 154 is also negative, the system will continue to monitor the temperature sensor in steps 152 and 154 until one of these conditions is met.

Returning to step 148, if this decision is negative, then the system checks to determine whether the temperature sensed by the bottom temperature sensor is less than the set point by 10° F. or more at step 156. If not, then no heating is required and the system will simply continue to monitor the previous decision steps as shown in FIG. 7. However, if the temperature sensed by the bottom sensor is less than the set point by 10° F. or more, then step 158 will energize the bottom heating element. Once power has been applied to the bottom heating element at step 158, the bottom temperature sensor will be monitored to determine whether it is within 5° F. of the set point with a temperature rise rate of 2° F. per second or more at step 160. If this check is positive, then the heating element may be de-energized at step 142 as the continued temperature rise will likely reach the set point temperature without further heating. If, however, step 160 is negative, then the temperature sensed by the bottom sensor will be monitored to determine if it is greater than or equal to the set point temperature at step 162. If this decision is positive, the heating element may be de-energized at step 142 as the set point temperature has been reached. However, if this condition is negative at step 162, the system will continue to monitor the temperature sensed by the bottom temperature sensor until one of these two conditions is met and the bottom heating element may be de-energized.

As discussed above, if an alternative source of energy is available at step 144, the system will prioritize its use and alter its operating algorithms to utilize this alternative source of power recognizing that the capacity of such sources may be limited at step 146. Such operation is illustrated in the flow diagram of FIG. 8. As with the operation with grid power, the system first checks to determine if the PCB temperature is greater than 70° C. at step 164. If this check is positive, then the elements are powered off as illustrated in step 166. If, however, the PCB temp is not greater than 70° C., then the system checks to verify that the alternative source of energy is available at step 168. If an alternative source is not available, then the system will return to the operation as illustrated in FIG. 7 at step 170.

However, if the alternative energy source check at step 168 is positive, then the system checks the temperature monitored by the top temperature sensor to determine whether it is lower than the set point by 20° F. or more at step 172. This additional temperature difference allows for a wider variation in the sensed temperature from the set point recognizing that the capacity of the alternative energy source may be lower than the grid power and therefore should be utilized sparingly so as to not deplete the source unnecessarily. If this decision at step 172 is positive, then the top heating element is energized at step 174.

Once energized, the temperature monitored by the top temperature sensor is monitored to determine whether it is within 10° F. of the set point with a temperature rise differential greater than 2° F. per second at step 176. If it is, then the heating element may be de-energized at step 166 as it is likely that the temperature will continue to rise to meet the set point without further utilization of the alternative power source. If, however, this condition is not met at step 176, then the temperature monitored by the top temperature sensor is checked to determine whether it is greater than or equal to the actual set point temperature at step 178. If not, the system continues to monitor these parameters in order to determine when the energization of the heating element may be discontinued. If, however, this condition is met at step 178, the system de-energizes the heating element at step 166 as the set point temperature has been reached.

Returning to decision block 172, if this condition is not met then the temperature monitored by the bottom temperature sensor is checked to determine whether it is less than 20° F. or more from the set point temperature at step 180. If this condition is not met, the system continues to monitor the temperature sensors at step 164 as illustrated in FIG. 8. If, however, the determination at step 180 is positive, then the bottom heating element is energized at step 182. Once energized, the system then monitors the temperature of the bottom temperature sensor to determine whether it is within 10° F. of the set point with a temperature rise differential of greater than 2° F. per second as illustrated at decision block 184. If this determination is negative, then the system checks to see whether the temperature monitored by the bottom temperature sensor is equal to or greater than the set point at step 186. If not, the system will continue to monitor the temperature sensed by the bottom temperature sensor until one of these two conditions is reached at which point the bottom heating element is de-energized at step 166.

Figure 9:
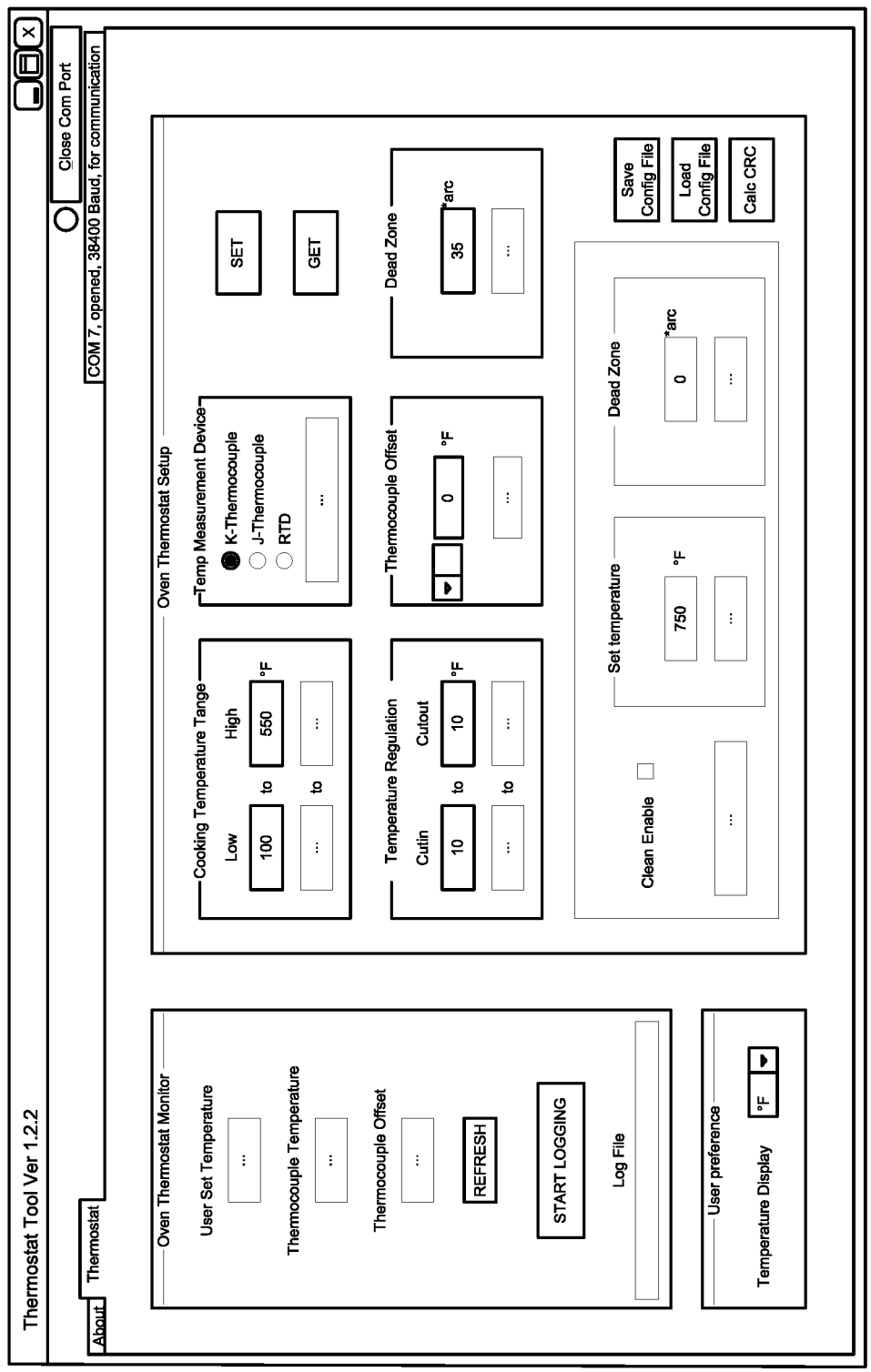
FIG. 9 is a screen shot illustration of an embodiment of a thermostat configuration tool user interface for use with embodiments of the appliance controllers of the present invention.

While the preceding discussion of the operation illustrated in FIGS. 7 and 8 utilize particular parameters, such parameters are not limiting but instead merely discuss one embodiment of the enhanced control enabled by the present invention. Indeed, as illustrated in FIG. 9, a configuration user interface may be provided that allows these various parameters to be modified to fine tune operation of the system based on the particular type of alternative energy source and capacity available in a particular installation, or use with a particular model. Such reprogramming of the controller 100, 100' may be accomplished via the RS485 network illustrated in the above-described embodiments, or may be wirelessly transmitted to the controller in embodiments utilizing such wireless interface.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method of controlling the operation of hot water heaters that takes into consideration the availability and capacity of alternative energy sources so that additional efficiencies can be realized, comprising the steps of:
   determining an availability of at least one alternative energy source;
   selecting an alternative energy source; and
   adjusting temperature decision points used to control energization of a heating element of the hot water heater based on the step of selecting.

2. The method of claim 1, wherein the step of adjusting further comprises the step of adjusting the temperature decision points that are at least one of a temperature of hot water of the hot water heater and the rate of rise of the temperature of the hot water heater.

3. The method of claim 2, further comprising:
   sensing a temperature of a controller of the hot water heater; and
   de-energizing the heating element when the sensed temperature is greater than a predetermined temperature threshold.

4. The method of claim 1, wherein the step of selecting comprises the step of selecting one of grid power, solar power, heat pump, or wind power.

5. The method of claim 2, further comprising the steps of:
   sensing the temperature of the hot water;
   determining the rate of rise of the temperature of the hot water heater;
   comparing the sensed temperature and the rate of rise with the temperature decision points from the step of adjusting; and then
   controlling the energization of the heating element to control the efficiency of the hot water heater based on the temperature decision points.

6. The method of claim 1, wherein the step of adjusting further comprises the step of manually adjusting the decision set points.

7. The method of claim 1, wherein the step of adjusting further comprises the step of electronically adjusting the decision points.

8. The method of claim 1, further comprising the steps of:
   receiving a signal:
   controlling energization the heating element based on the signal.

9. The method of claim 8, wherein the step of controlling further comprises de-energization of the heating element based on the signal.

10. The method of claim 8, wherein the step of controlling further comprises the step of executing an algorithm to control energization of a heating element.

11. The method of claim 8, wherein the step of controlling further comprises the step of adjusting temperature decision points of a controller.

12. An electronic controller for a hot water heater, comprising:
   a controller;
   an ambient temperature sensor positioned in proximity to the controller;
   wherein the controller disables operation of the water heater when a temperature of the controller is greater than a threshold temperature; and
   wherein the controller is configured to monitor the availability of alternative energy sources and to adjust temperature decision points based on the availability of the alternative energy sources.

13. The electronic controller of claim 12, wherein the alternative energy sources are one or more of the alternative energy sources selected from the group of solar power, heat pump, and wind power.

14. The electronic controller of claim 12, further comprising a bi-metallic high limit switch operable to de-energize a heating element of the hot water heater.

15. The electronic controller of claim 14, further comprising a high limit reset button for manually resetting the bi-metallic high limit switch.

16. The electronic controller of claim 12, wherein the electronic controller is sized to replace a pre-existing analog controller for the hot water heater.

17. The electronic controller of claim 13, further comprising a network interface; and wherein the controller is operable to receive and process signals to control energization of a heating element.

18. The electronic controller of claim 12, wherein the ambient temperature sensor is located on a printed circuit board of the controller.

* * * * *